(12) United States Patent
Buthler

(10) Patent No.: US 9,716,558 B1
(45) Date of Patent: Jul. 25, 2017

(54) COMMUNICATION DEVICE AND A METHOD FOR OPERATING A COMMUNICATION DEVICE

(71) Applicant: Intel IP Corporation, Santa Clara, CA (US)

(72) Inventor: Jakob Buthler, Aalborg (DK)

(73) Assignee: INTEL IP CORPORATION, Santa Clara, CA (US)

(*) Notice: Subject to any disclaimer, the term of this patent is extended or adjusted under 35 U.S.C. 154(b) by 0 days.

(21) Appl. No.: 15/187,863

(22) Filed: Jun. 21, 2016

(51) Int. Cl.
*H04B 17/309* (2015.01)
*H04B 7/0404* (2017.01)
*H04W 88/06* (2009.01)

(52) U.S. Cl.
CPC ......... *H04B 17/309* (2015.01); *H04B 7/0404* (2013.01); *H04W 88/06* (2013.01)

(58) Field of Classification Search
CPC .................................................... H04W 76/02
See application file for complete search history.

(56) References Cited

U.S. PATENT DOCUMENTS

| | | | | |
|---|---|---|---|---|
| 2003/0096638 | A1* | 5/2003 | Doi .................. | H01Q 3/2605 455/562.1 |
| 2013/0040618 | A1* | 2/2013 | D'amato ........... | H04M 1/72522 455/414.1 |
| 2013/0344881 | A1* | 12/2013 | Nakasato .............. | H04L 5/0023 455/450 |
| 2016/0126903 | A1* | 5/2016 | Abdelrahman ...... | H04B 1/0475 330/149 |

OTHER PUBLICATIONS

"3rd Generation Partnership Project; Technical Specification Group Services and System Aspects; Policy and charging control architecture", 3GPP TS 23.203, 2014, 220 pages.
Buthler et al., "CQI reporting strategy for Multi-SIM UEs", 2016, 5 pages, IEEE.
Ericsson, "Dual-SIM Dual-Standby UEs and their impact on the RAN", Technical Report RP-111637, 3GPP, 2011, 3 pages.
Francis et al., "An Architecture to Support Multiple Subscriber Identity Applications Accessing Multiple Mobile Telecommunication Access Network Systems", Third 2008 International Conference on Convergence and Hybrid Information Technology, 2008, pp. 386-395.
Buthler et al., "RLC SDU loss and arrival delay in Multi-SIM UEs", 2015, 5 pages, IEEE.
Nosheen et al., "Handling Multiple SIMs—A Framework based on Software Restructuring Approach", 2011 Third International Conference on Communications and Mobile Computing, 2011, pp. 178-181.

* cited by examiner

*Primary Examiner* — Hsin-Chun Liao

(74) *Attorney, Agent, or Firm* — Viering, Jentschura & Partner MBB

(57) ABSTRACT

A method and device for providing access to a radio frequency (RF) unit of the device, comprising assigning a static weight value to each of a plurality of signals, calculating a true weight value for each signal comprising modifying the static weight value with a dynamic value, wherein the dynamic value is based on at least one of a performance consideration value or a signal status value, determining a signal with a highest true weight value from the plurality of signals; and providing the signal with the highest true weight value access to the RF unit of the device.

16 Claims, 9 Drawing Sheets

| Data | Weight | | Data Content |
|---|---|---|---|
| | $W_{init}$ | $W_{max}$ | |
| PCCH | 7 | 14 | Paging information from the BS |
| BCCH | 5 | 10 | Broadcast channel (may contain EWTS or critical system info) |
| CCCH | 5 | 10 | Common control |
| DCCH | 4 | 8 | Dedicated control |
| TCH | 4 | 9 | 2g speech |
| RSSI | 3 | 8 | Channel measurement |
| GPRS | 3 | 9 | 2g data |
| DPDCH | 3 | 9 | Dedicated data |
| SACCH | 3 | 8 | Slow control channel |

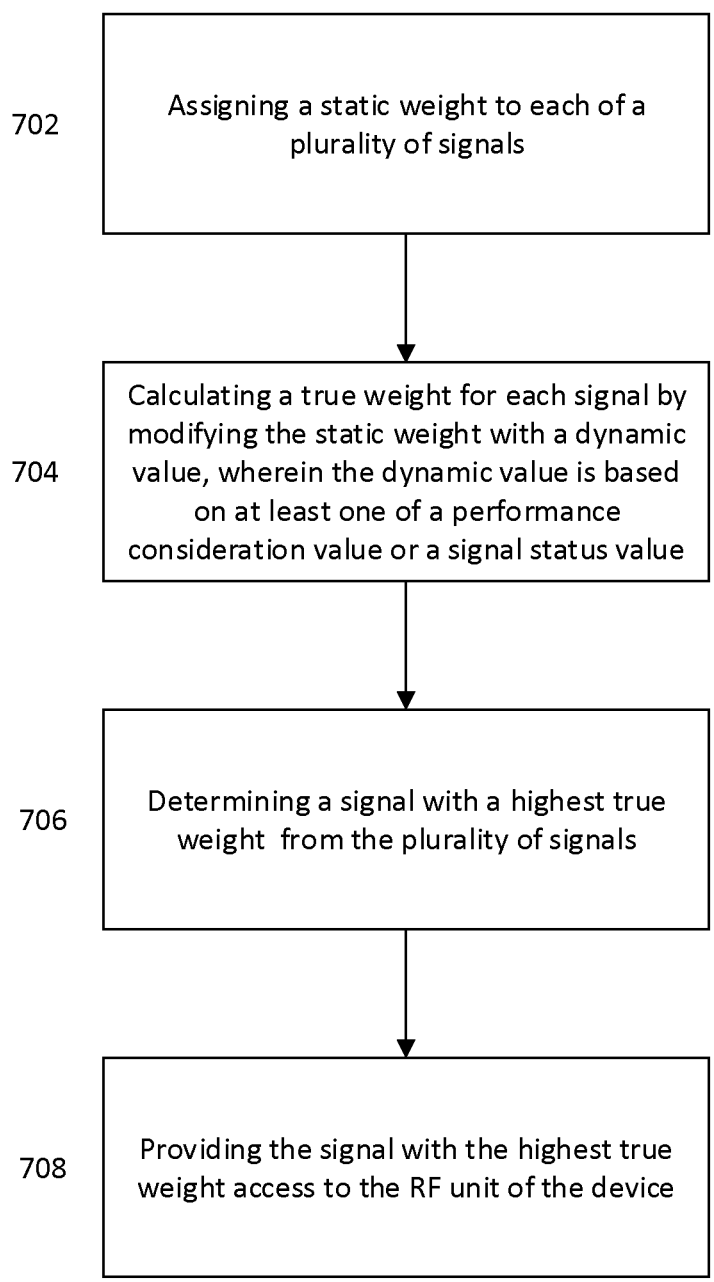

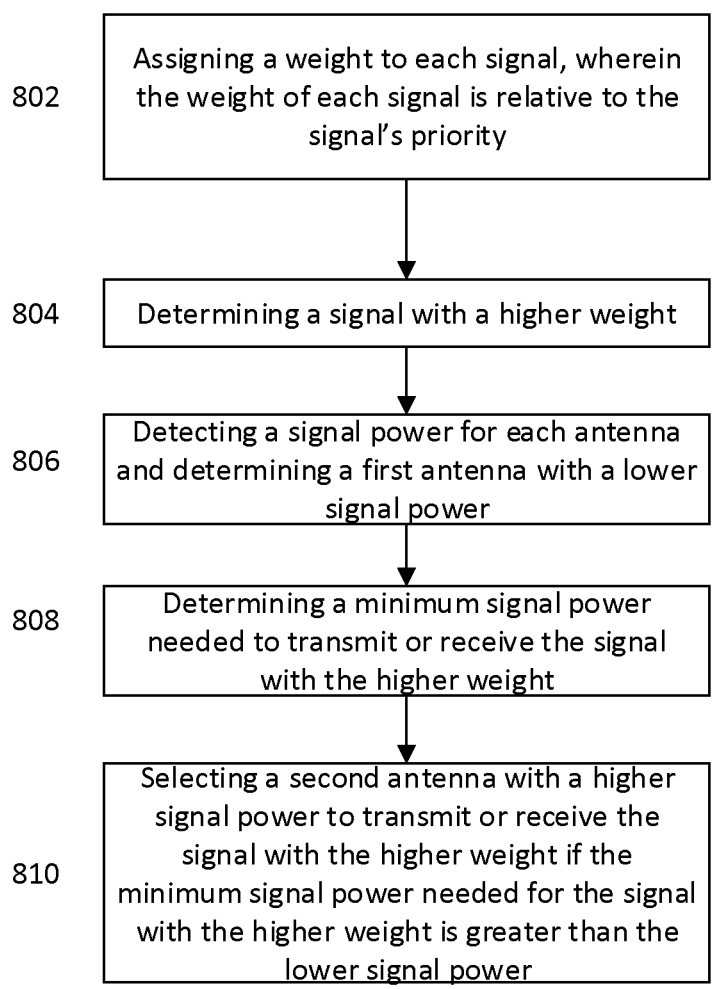

COMMUNICATION DEVICE AND A METHOD FOR OPERATING A COMMUNICATION DEVICE

TECHNICAL FIELD

Various aspects of this disclosure relate generally to a method and a device for mobile communications.

BACKGROUND

In a user equipment (UE) with multiple subscriber identity modules (SIMs), conflict occurs when different connections request access to the same radio frequency (RF) hardware, especially, for example, if the UE only has one transmitter. Such conflicts are resolved by a controller which uses a prioritization of data content within the different signals of the transmission time intervals (TTIs) requesting access to the RF hardware. As a result, data is discarded for one of the SIMs because of the limited access to the UE's available RF hardware.

Modern RATs like LTE have implemented a retransmission protocol for data packets on the physical (PHY) layer. This PHY layer retransmission makes the radio link friendlier to the transmission control protocol (TCP) as it decreases the variation in round trip time for the data. In order to ensure that a data packet is not stuck in an inefficient retransmission loop, e.g. in a sudden decrease in data quality, the data will only be retransmitted within a certain timeframe before expire. In uplink, the time between the transmissions is set at a fixed interval of 8 ms, whereas in downlink it is flexible and varies depending on the scheduler.

Multi-SIM operation may significantly increase the probability of momentary high round trip times for TCP data as it may discard packets which are close to expiration. This will lead to the system discarding data, which will trigger a slow start algorithm of the TCP.

Resolving a conflict within a Multi-SIM UE is currently done using a lookup table in which the SIM with the highest priority is granted access to the RF unit. However, as the amount of simultaneously supported Radio Access Technologies (RATs) increases, these lookup tables prove insufficient.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the disclosure are described with reference to the following drawings, in which:

FIG. 3 shows a weight table example for different types of signals/content with both an initial weight (i.e. a static weight) and a maximum achievable weight in an aspect of this disclosure.

FIG. 7 shows a flowchart in an aspect of this disclosure.

FIG. 8 shows a flowchart in an aspect of this disclosure.

DESCRIPTION

Figure 1:
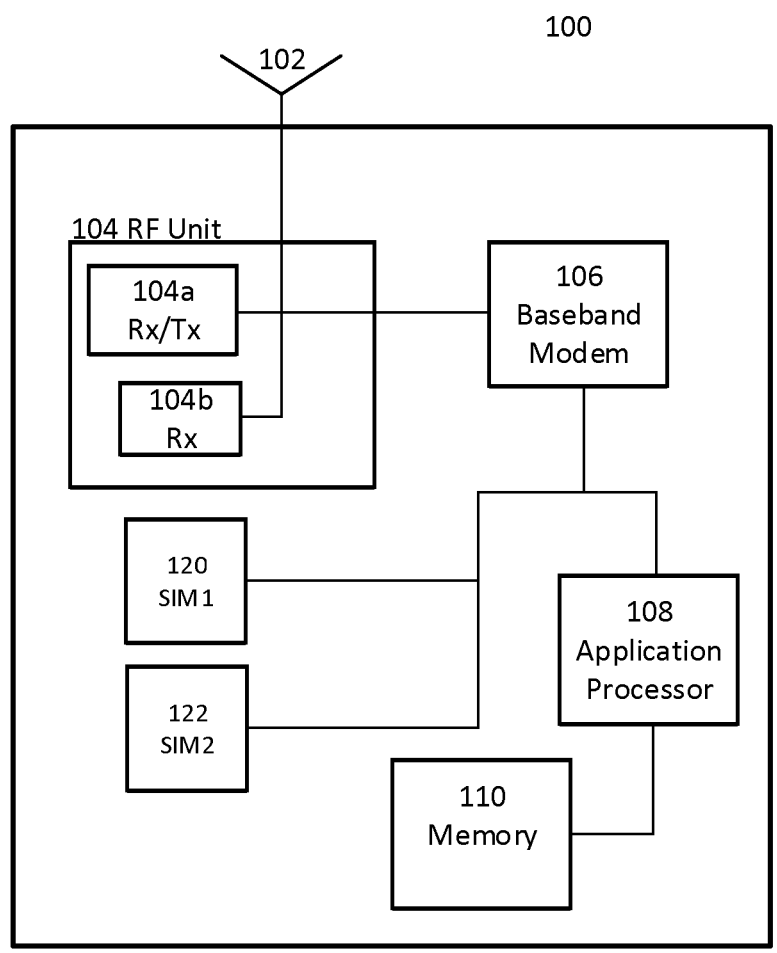
FIG. 1 shows a communication device in an aspect of this disclosure.

The following detailed description refers to the accompanying drawings that show, by way of illustration, specific details and aspects of the disclosure which may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry" or "processor") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel, e.g. frequency. There can be multiple cells on a single frequency. Each base station provides a cell with a specific ID, known as a cell ID. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is appreciated that the ensuing description may detail exemplary scenarios involving mobile terminal operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component)

As utilized herein, the term "idle mode" used in reference to a mobile terminal refers to a radio control state in which the mobile terminal is not allocated at least one dedicated communication channel of a mobile communication network. The term "connected mode" used in reference to a mobile terminal refers to a radio control state in which the mobile terminal is allocated at least one dedicated communication channel of a mobile communication network.

The ensuing disclosure increases the versatility of conflict handling in accessing a UE's RF unit from a plurality of signals/data by making it possible to increase/decrease the prioritization of the different signals based on the signal history and probability of reception/transmission. The prioritization disclosed herein may be viewed as a weight factor which decides the real-time importance of each signal. The signal with the highest weight, i.e. the signal with highest determined importance, may then be granted access to the RF hardware.

In one example, the weight of the reception/transmission of a signal is increased if it is close to outliving its maximum retransmission time. This will allow data which is about to expire to achieve a higher weight than another signal, e.g. a paging, which was already successfully received. As a result, the Multi-SIM operation will be more Transmission Control Protocol (TCP) friendly and improve UE performance.

In another example, the weight is increased for a data packet that is close to expiration, which decreases the probability that the data packet will be discarded, thereby increasing the UE's throughput performance.

In another example, the weight of a paging reception may be increased if the previous incoming paging has not been received. This decreases the probability of missing an incoming call.

In another example, a system information, e.g. network broadcasted System Information Blocks (SIBs), or synchronization data may achieve higher weights based on their last reception, i.e. a higher weight for longer durations without reception. Additionally, the UE may increase the weight if it is determined that the probability of being unsynchronized is high.

In general, as disclosed in the following explanation, the signal reception/transmission procedure will be significantly more adaptable, thereby increasing end-user performance. Furthermore, the processes and devices described herein allow for improved handling of corner cases and special cases which may otherwise degrade UE performance.

FIG. 1 shows a UE 100 in an exemplary aspect of this disclosure. UE 100 is configured to grant access to its radio frequency (RF) unit 104 from a plurality of signals based on performance considerations and/or signal status. It is appreciated that UE 100 is exemplary in nature and may thus be simplified for purposes of this explanation.

As shown in FIG. 1, UE 100 may include an antenna 102, a radio frequency (RF) unit 104, baseband modem 106, application processor 108, a memory component 110, and two SIMs 120, 122. RF unit 104 may include, for example, a reception/transmission (Rx/Tx) unit 104a and reception (Rx) unit 104b as shown in FIG. 1. While the RF unit is shown having an Rx/Tx and an Rx component, it is understood that this disclosure may also be applied to other RF unit configurations, e.g. a RF unit with a plurality of transmit components, an RF unit with one Rx component, an RF unit with more than two Rx components, etc.

These components may be implemented separately; however, it is appreciated that the configuration of UE 100 is for purposes of explanation, and accordingly, one or more of the aforementioned components of UE 100 may be integrated into a single equivalent component or divided into multiple components with collective equivalence. It is also appreciated that UE 100 may have one or more additional components, such as hardware, software, or firmware elements. For example, UE 100 may also include various additional components including processors, microprocessors, at least one power supply, peripheral device(s) and other specialty or generic hardware, processors, or circuits, etc., in order to support a variety of additional operations. For example, UE 100 may also include a variety of user input/output devices, such as display(s), keypad(s), touchscreen(s), speaker(s), microphone(s), button(s), camera(s), etc. Furthermore, it is appreciated that the connections between components in UE 100 may be modified, e.g. SIM1 120 and/or SIM2 122 may be directly coupled to baseband modem 106.

In an overview, UE 100 may be configured to receive and/or transmit wireless signals according to multiple different wireless access protocols or radio access technologies (RATs), for example, any one or combination of: Long-Term Evolution (LTE), Global System for Mobile Communications (GSM), Universal Mobile Telecommunications System (UMTS), Code Division Multiple Access (CDMA), Wideband CDMA (W-CDMA), Wi-Fi, Wireless Local Area Network (WLAN), Bluetooth, etc. It is appreciated that separate components may be provided for each distinct type of compatible wireless signal, such as a dedicated LTE antenna, RF transceiver, and baseband modem for LTE reception and transmission and a dedicated Wi-Fi antenna, RF transceiver, and a baseband modem for Wi-Fi reception and transmission. Alternatively, one or more components of UE 100 may be shared between different wireless access protocols, such as, for example, by sharing an antenna 102 between multiple different wireless access protocols or RATs. In an exemplary aspect of this disclosure, RF unit 104 and/or baseband modem 106 may operate according to multiple communication access protocols (i.e. "multimode"), and thus may be configured to support one or more of LTE, GSM, and/or UMTS access protocols.

Furthermore, RF unit 104 may receive frequency wireless signals via antenna 102, which may be implemented, for example, as a single antenna or an antenna array composed of multiple antennas. Antenna 102 may be an external antenna or an internal antenna. RF unit 104 may include various reception circuitry elements, for example, analog circuitry configured to process externally received signals, such as circuitry to convert externally received RF signals to baseband and/or intermediate frequencies. RF unit 104 may also include amplification circuitry to amplify externally received signals, such power amplifiers and/or Low Noise Amplifies, although it is appreciated that such components may also implemented separately. RF unit 104 may additionally include various transmission circuit elements configured to transmit signals, such as, for example, baseband and/or intermediate frequency signals provided by the baseband modem 106, which may include mixing circuitry to modulate signals onto one or more radio frequency carrier waves and/or amplification circuitry to amplify internal signals before transmission. The RF unit 104 may provide such signals to antenna 102 for wireless transmission. Although not explicitly depicted in FIG. 1, RF unit 104 may be additionally connected to other components of the UE 100.

RF unit 104 may consist of a RX/TX unit 104a and RX AUX unit 104b, or other variations of reception and transmission components. In the exemplary configuration shown in FIG. 1, the RF unit 104 has two receiver units (one in the Rx/Tx 104a and one in the Rx 104b), and therefore, UE 100 may be capable of receiving two separate transmissions concurrently. For example, SIM1 120 may be receiving an evolved Multimedia Multicast Service (eMBMS) stream on an LTE network while SIM2 122 places a phone call on 2G or 3G. Since UE 100 has only one transmitter in the RF unit 104, i.e. the transmitter in the Rx/Tx unit 104a, UE 100 may not be capable of transmitting two signals on different communication channels concurrently. Consequently, UE 100 may be configured to prioritize access to the RF unit 104 in order to maximize device performance.

Baseband modem 106 may include one or more digital processing circuits and a baseband memory. Baseband modem 106 may further include one or more additional components, including one or more analog circuits.

The digital processing circuits may be composed of various processing circuitry configured to perform baseband (also including "intermediate") frequency processing, such as Analog to Digital Converters and/or Digital to Analog Converters, modulation/demodulation circuitry, encoding/decoding circuitry, audio codec circuitry, digital signal processing circuitry, etc. The digital processing circuit(s) may include hardware, software, or a combination of hardware and software. Specifically, digital processing circuit(s) of baseband modem 106 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof.

The baseband memory may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. The baseband memory may be configured to store software elements, which may be retrieved and executed using a processor component of digital processing circuitry. The baseband memory may be implemented as one or more separate components in the baseband modem 106 and may also be partially or fully integrated with the digital processing circuitry.

The baseband modem 106 may be configured to operate one or more protocol stacks, such as a GSM protocol stack, an LTE protocol stack, a UMTS protocol stack, a CDMA protocol stack, etc. or any combination thereof. Baseband modem 106 may be multimode and may thus be configured to operate in accordance with multiple RATs by executing multiple protocol stacks simultaneously. The digital processing circuit(s) in the baseband modem may therefore include a processor configured to execute program code in accordance with the protocol stacks of each associated RAT. The baseband memory may be store the aforementioned program code. The baseband modem 106 may be configured to control one or more further components of mobile terminal 100. The protocol stack(s) of baseband modem 106 may be configured to control operation of the baseband modem 106, such as in order to transmit and receive mobile communication in accordance with the corresponding RAT(s).

It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 106 may be detailed herein substantially in terms of functional operation in recognition that a person of skill in the art may readily appreciate the various possible structural realizations of baseband modem 106 using digital processing circuitry that will provide the desired functionality.

In a first exemplary aspect of the disclosure, the baseband modem is configured to provide access to the RF unit from a plurality of signals by assigning an initial weight (i.e. static weight) to each signal, calculating a true weight for each signal based on performance considerations and/or signal status, determining the signal with the highest true weight, and granting the signal with the highest true weight access to the RF unit. The plurality of signals may include, for example, paging signals for either 2G/3G communications, cell selection/reselection signals, packet switching (PS) data, or the like.

Furthermore, the baseband modem may be configured to determine the true weight of each signal based on the signal history and/or the probabilities of reception/transmission of each signal. An initial weight (i.e. static weight) assigned to each signal may be based on the Media Access Control (MAC) layer content of the data which is transmitted and/or received. Within the physical (PHY) layer, the MAC, Radio Link Control (RLC), and/or Radio Resource Control (RRC), the initial weight is altered based on different factors, and is shown by:

$$W_{TTI}(i) = W_{init} * \delta * \alpha \qquad (1)$$

where $W_{TTI}(i)$ is the modified weight (i.e. the true weight used in prioritization; the real-time weight used in prioritization for each TTI), $W_{init}$ is the initial weight set for the signal, $\delta$ is a value based on the probability of data reception/transmission, and $\alpha$ is a value based on the signal history, e.g. the history of the previous transmission of the current data content. $\delta$ and $\alpha$ may be determined from functions describing different scenarios within the first layer (L1) and are explained in examples in further detail below. More or less factors may be added based on the desired flexibility. As signals are added to the PHY layer, different types of signals may have different versions of $\delta$ and $\alpha$.

Other factors to alter the initial weight may be added to the equation (1). For example, a factor describing the minimum required signal power of an antenna in order to receive/transmit a signal with a certain probability may be added. A factor such as $\zeta$ would allow for a multi-antenna device to implement methods to increase the throughput capabilities of the device.

Figure 5:
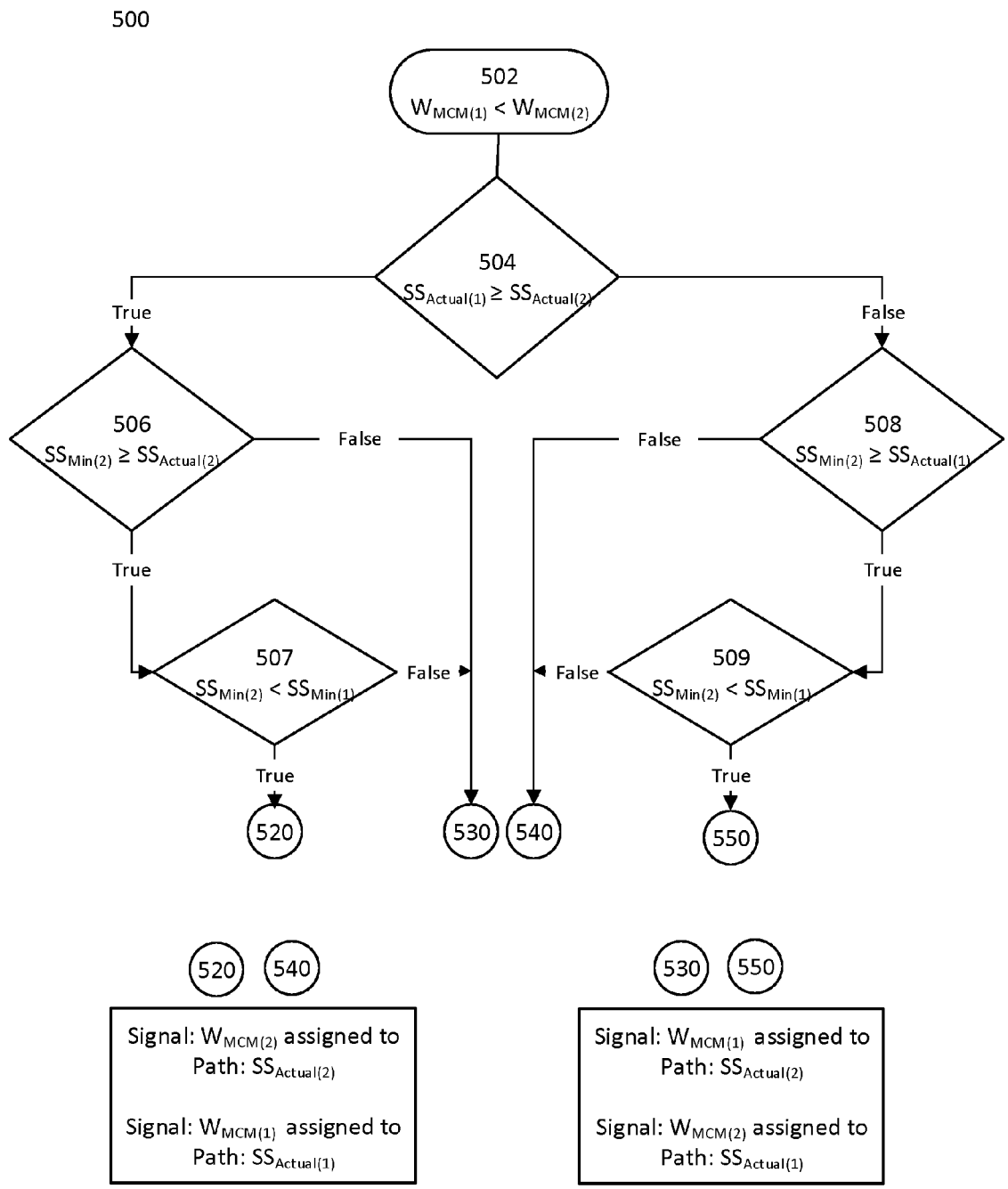
FIG. 5 shows a best antenna selection process in an aspect of this disclosure.

In another exemplary aspect of this disclosure, the baseband modem is configured to provide access to an RF unit with multiple antennas by implementing a Best Antenna Selection (BAS) procedure, e.g. as shown in FIG. 5, which increases performance by avoiding assigning a receiver with high power to a robust signal if another lower weighted signal may have better use of the receiver.

The application processor 108 may be implemented as a Central Processing Unit (CPU), and may function as a controller of mobile terminal 100. The application processor 108 may be configured to execute various applications and/or programs of mobile terminal 100, such as, for example, applications corresponding to program code stored in a memory component of mobile terminal 100 (not shown in FIG. 1). The application processor 108 may also be configured to control one or more further components of mobile terminal 100, such as, for example, input/output devices (e.g. display(s), keypad(s), touchscreen(s), speaker(s), microphone(s), button(s), etc.) peripheral devices, a memory, power supplies, external device interfaces, etc.

Although the baseband modem 106 and application processor 108 are depicted separately in FIG. 1, it is appreciated that the figure is not limiting in nature. It is understood that the baseband modem 106 and the application processor 108 may be implemented separately, implemented together (i.e. as an integrated unit), partially implemented together, etc.

Figure 2:
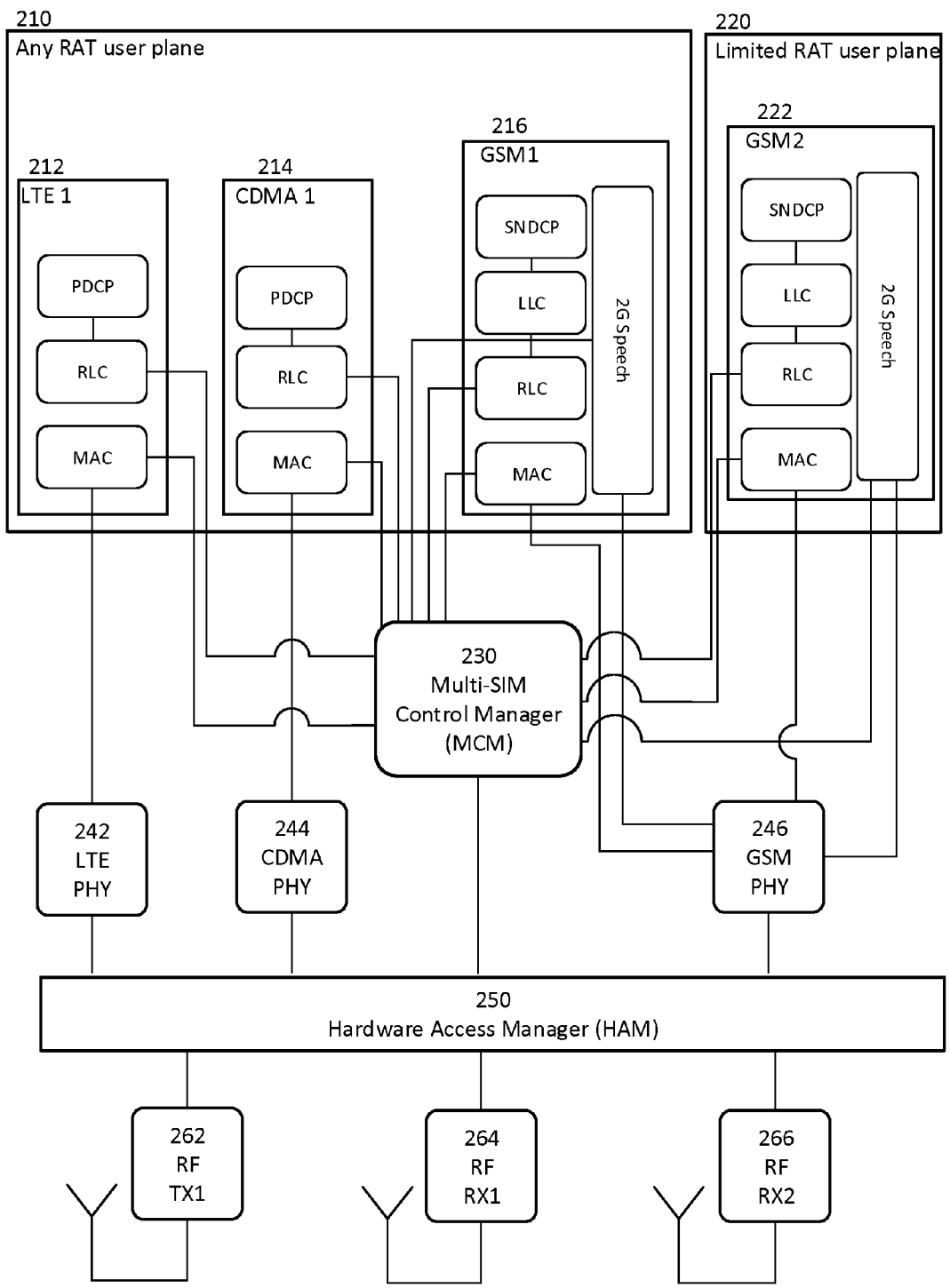
FIG. 2 shows a centralized framework of a communication device in an aspect of this disclosure.

FIG. 2 shows a centralized framework 200 of a communication device in an aspect of this disclosure. It is appreciated that framework 200 is exemplary in nature and may thus be simplified for purposes of this explanation.

Framework 200 shows a device supporting two user planes: an Any-RAT 210 user plane which supports LTE 212, CDMA 214, and GSM 216 and a Limited RAT 220 user plane which only supports one RAT, in this case, GSM 222. The Limited RAT 220 user plane can, however, be limited to supporting other types of RATs, such as CDMA, UMTS, LTE, etc. The PHY layers, LTE 242, CDMA 244, and GSM 246, in turn provide the interface between the transmission medium and the higher layers of the protocol stack, e.g. the MAC layers.

While framework 200 focuses on a dual SIM device with a low amount of RF hardware, it is understood that framework 200 may support other combinations and increased numbers of supported RATs and/or RF connections as well.

In framework 200, the user plane protocol stacks (i.e. Packet Data Convergence Protocol (PDCP), Radio Link Control (RLC), Media Access Control (MAC), Sub Network Dependent Convergence Protocol (SNDCP), and Logical Link Control (LLC)) are duplicated per RAT (as applicable) connection as they primarily contain information of the network state and other specific data. The GSM PHY layer 246 is reused for the GSM connection under the assumption that it has enough computational power to support the requested processing. While the following explanation may primarily focus on the UE receive side, it is appreciated that the ensuing disclosure is also suitable for handling UE transmission conflicts.

The core of framework 200 is the Multi-SIM Control Manager (MCM) 230, which processes data input from all of the protocol stacks and outputs a weight for each TTI conveyed to the Hardware Access Manager (HAM) 250 based on the data content. The MCM implements the weighing process in two steps. First, an initial weight (i.e. static weight) is given to each signal. This initial weight may be based on a lookup table or the like. Second, the initial weight is modified based on several factors, e.g. signal history or probability of reception/transmission. In the HAM 250, the weights calculated by the MCM 230 are paired with the respective signal/data and an access grant procedure is implemented. The access grant process is based on the weights from the MCM as well as input from each path, indicating the assumed signal power for a given path. The connection between HAM 250 and MCM 230 is a two way communication so that the selection made by the HAM 250 is fed back to the MCM 230 in order for the MCM 230 to use the information for the next weighing of the same signals/data content. Similarly, the MCM connections with the protocol stacks are two way so that the protocol stacks know they should, for example, schedule another network scan or data connection request.

In framework 200, three RF paths are shown, one transmission (Tx) path 262 and two reception (Rx) paths, 264 and 266. With only one Tx path, conflicts are unavoidable if multiple protocol stacks want to transmit simultaneously. With two Rx paths, it is possible to have two receive operations in parallel. However, assuming that the RF paths are connected to uncorrelated antennas, the paths would be usable on a single connection in order to increase performance using Multiple Input Multiple Output (MIMO) techniques such as chase combining, or carrier aggregation. Therefore, even though multiple RF paths are available, conflicts will occur whenever two different connections request access simultaneously.

The output of the MCM 230 is calculated based on the information of the individual channels. Some examples are presented in table 300 in FIG. 3 along with their respective initial weight factor and a maximum weight achieved through the processes and methods discussed herein. The weigh factor is based on the importance of the TTI data content compared to each other in respect to a set of Multi-SIM UE Key Performance Indicators (KPIs). In general, the highest weighted data are those which are important in respect to keeping the UE connected. For example, reception of the Paging Control Channel (PCCH) is of highest priority as this allows for the base station to contract the UE with information of pending data. Without receiving this data, the UE will miss incoming calls. Similarly, the Received Signal Strength Indicator (RSSI) measurements are crucial for maintaining an idle connection. Broadcast channels are prioritized based on the assumed content, i.e. control channels are prioritized with a higher weight than data channels since they are crucial to maintain a connection.

The initial weight factor shows the prioritization of the signals in relation to each other in general. However, simply using the initial weights in a static weight approach is insufficient when an optimal conflict handling is desired in order to maximize a UE's performance. In order to reduce interference between the connections, it is necessary to reduce the amount of conflicts as much as possible, as well as handle certain corner cases, where signals which would otherwise have low weight need to have a high weight.

In order to implement a dynamic weighing process, factors such as the two shown in equation (1) are used to modify the initial weight, $W_{init}$. Equation (1) is reproduced below:

$$W_{TTI}(i)=W_{init}*\delta*\alpha \quad (1)$$

$\delta$ is a performance consideration factor determined from the probability of data reception/transmission and ranges from a minimal desired value of the true weight to a maximum desired value of the true weight. For example, $\delta$ may range from 0 to 1. It is used to decrease the weight of a signal which is not needed at the current time. For example, use of the $\delta$ may include an idle mode read of a system information because it is not required to be read every time that it is scheduled. The $\delta$ factor may also be used for data which is multiplexed to multiple transmission time intervals (TTIs) separated in time, i.e. the $\delta$ factor may be minded on the types of data which are multiplexed onto multiple PHY layer TTIs in order to increase robustness. Depending on the Signal to Interference and Noise Ratio (SINR) of the channel at the given reception time, it may be sufficient to receive only a fraction of the TTIs.

An example of a RAT which uses such a procedure is GSM, where both speech data, incoming pagings, and others, are multiplexed onto four bursts which are separated in time. In good radio conditions, it is possible to analyze the pagings using only two of the four bursts. In such a case, the $\delta$ factor is used to ensure that the redundant part of the signal does not create conflicts with other signals. The same is applicable for the GSM speech packet, where it is possible to utilize the redundancy in the encoding to achieve understandable speech while having fewer conflicts. For LTE, $\delta$ may be associated with the probability of remaining synchronization to the base station (BS) if not receiving the Primary Synchronization Signal (PSS) or the Secondary Synchronization Signal (SSS).

In an exemplary embodiment, $\delta$ may be determined by a factor of the probability of successfully conveying the data through the link, $P_{success}$.

$$\delta = \begin{cases} 1, & \text{if } P_{success} \geq P_{limit} \\ 0.5, & \text{otherwise} \end{cases} \quad (2)$$

where $P_{limit}$ is the minimal value which can be reached based on system requirements. While Equation (2) uses 0.5 as the "otherwise value," other values lower than 1 may be used.

For example, in GSM paging control channel (PCCH) reception, P equal to $P_{success}$ is the probability of receiving the PCCH given the estimated signal quality of the received PCCH bursts. PCCH reception has a high priority, therefore, $P_{limit}=1$. $P_{success}$ for LTE synchronization is dependent on the drift between the BS and the UE and the time since the last PSS or SSS was read. If the probability of the remaining synchronization towards the BS is higher than the limit $P_{limit}$, a PSS or a SSS may be missed. Likewise, δ may be used for subframe reception in LTE, where all symbols need not be received if the subframe does not contain any data content meant for the UE.

Figure 4:
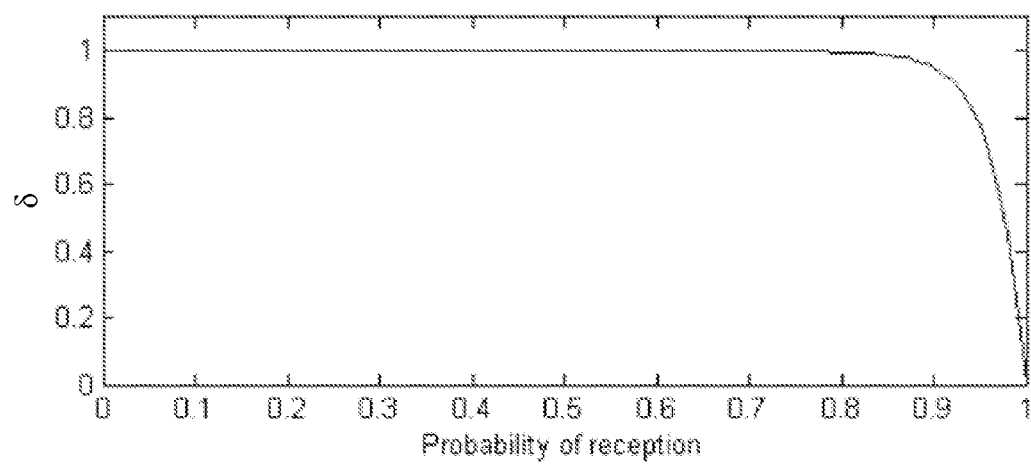
FIG. 4 shows a graph depicting the δ value as a function of the probability of reception in an aspect of this disclosure.

In another embodiment, δ may be determined as a function of the probability of reception/transmission, λ(CSI). The channel state information (CSI) may be based on: received power measurements, base station robustness request, or other like factors. The probability of reception in one embodiment, is mapped to δ as:

$$\delta(CSI) = 1 - \exp((\lambda(CSI)-1)g) \quad (3)$$

where λ(CSI) is the probability of reception (at either the base station or the UE) and g is the gain. Graph 400 in FIG. 4 shows an example function for determining δ with a gain of 60, i.e. g=60. As seen in graph 400, the δ value, and therefore the weight, will be maintained for a wide range of reception probabilities. At high reception probabilities, the δ factor decreases, thereby decreasing the weight of the associated data/signal. This, in turn, frees up resources for other operations to occur in the rest of the TTIs since they are not needed for this particular reception.

α is a factor based on signal history, i.e. the history of the previous transmissions of the current data content. Whereas δ defines the possibility of reducing the weight if the signal already has a high usability, α is used to increase the weight based on the probability of failing to convey information between the UE and the base station.

In one embodiment, the α function for handling incoming pagings may be determined by the following formula:

$$\alpha_{pagings}(d_{id}) = 1 + N_{missed} \quad (4)$$

where $N_{missed}$ is the number of times the paging has been previously missed. If the previous paging was received, $N_{missed}=0$ and the pagings weight is equal to $W_{init}*\delta$. If the paging has been missed once, for example, then the pagings weight would be equal to $2 W_{init}*\delta$. Additionally, the pagings conflicts will be handled in accordance with the current Allocation and Retention Priority (ARP) which states that the pagings must at least be received at a periodicity of the number of SIMs supported.

In another embodiment, the α function may be based on the data payloads controlled by the Radio Link Control (RLC) Hybrid Automatic Repeat Request (HARQ) procedure. The a factor may be determined by the following function:

$$\alpha_{data}(p_{id}) = \begin{cases} 1, & P(T_{next} < T_{max} | T_d) < P_{min} \\ 3, & P(T_{next} < T_{max} | T_d) \geq P_{min} \end{cases} \quad (5)$$

where $P_{min}$ is the minimum loss rate defined by the Quality of Service (QoS) Class of Identifier (QCI) and $P(T_{next}<T_{max}|T_d)$ being the probability of the packet HARQ process to discard the data as the next retransmission, $T_{next}$, will be scheduled to occur later than the maximum retransmission, $T_{max}$, based on the current delay, $T_d$. $T_{max}$ is set by the network settings.

As an example, for LTE uplink, all retransmissions are made in intervals of 8 ms, which reduces the above expression to:

$$\alpha_{data}(p_{id}) = \begin{cases} 1, & T_d < T_{max} - 8 \\ 3, & T_d \geq T_{max} - 8 \end{cases} \quad (6)$$

In other cases, such as in LTE downlink, the retransmission time may vary. In such cases, the UE measures the time between each retransmission within a time window and uses these measurements to calculate the probability function.

In another embodiment, a general expressions for a may be given as:

$$\alpha = \begin{cases} x_\alpha, & \text{if } P_{failure} \geq P_{QCI} \\ 1, & \text{otherwise} \end{cases} \quad (7)$$

with $x_\alpha$ being the weight altering factor, $P_{failure}$ being the probability of the data content being completely lost, and $P_{QCI}$ being the Quality of Service (QoS) Class of Identifier (QCI).

The range of a ranges from 1 to a maximum value, $\alpha_{max}$, which fulfills the limitation that $\alpha_{max}*W_{init} \leq W_{max}$. Increasing the weight of α for a TTI increases the probability that it is chosen during a conflict and is used to ensure that critical information is successfully communicated.

The success criteria for reception of the PCCH, for example, is that no calls are missed. When the network pages a UE, it does so by transmitting the UE's identity multiple times through the PCCH, which is scheduled at a regular interval in time. It is a necessity to receive the PCCH as often as possible, therefore, the success criteria is based on the previous reception statues of the signal. To simplify the calculation, $P_{failure}$ for the PCCH may be based on a binary representation:

$$P_{failure} = \frac{\sum_{n=0}^{N_{bt}} N_{rx}(-n) * 2^n}{2^{N_{bt}}} \quad (8)$$

$$P_{QCI_{pcch}} = \frac{2^{N_{bt}-1} - 1}{2^{N_{bt}}} \quad (9)$$

where $N_{bt}$ is the amount of previous pagings which are considered and should be at least equal to the number of supported connections. A $N_{rx}(-n)$ is the status of the previous paging reception where zero indicates a successful reception and one indicates a failed reception. The paging QCI, $P_{QCI_{pcch}}$, ensures that the weight is increased if the previous pagings were missed or if multiple pagings were missed before being most recently received, which would be indicative of a bad channel environment.

The target of α with respect to data transfers is to decrease the Radio Link Control (RLC) Hybrid Automatic Repeat Request (HARQ) procedure data discard probability in order to make the Multi-SIM more Transmission Control Procedure (TCP) friendly. An example of an α for the LTE downlink HARQ procedure where the primary effort is to increase the weight significantly for data subframes which may contain data that might expire. The criteria denotes the probability for the next HARQ retransmission to be scheduled within a time, $T_{next}$, which exceeds the maximum retransmission time, $T_{max}$, given the current delay of the packet $T_d$:

$$P_{failure}=P(T_{next}>T_{max}|T_d) \qquad (10)$$

In such a case, the $P_{QCI}$ may be the Protocol Data Unit (PDU) drop rate specified by the data QCI, which, for example, is $10^{-6}$ for voice data on LTE. The probability function for the timeouts depend on the network algorithm settings. For LTE uplink, HARQ retransmits packets every 8 ms. In a system with flexible timing between each retransmission, the UE bases the decision on measurements of the current network scheduling strategy. The measurements are performed by storing the delay of each incoming retransmission for any arriving packets based on the ID and the previous reception timing. A histogram for these numbers will comprise a Cumulative Distribution Function, which may be used as a probability function in Equation (10).

In framework 200, there are multiple RF paths available for each connection, so it is possible to implement a Best Antenna Selection (BAS) procedure as part of conflict handling. This increases performance by avoiding to assign a high receiver (Rx) power path to a robust control channel reception if another lower weighted TTI has better use of it.

Figure 2A:
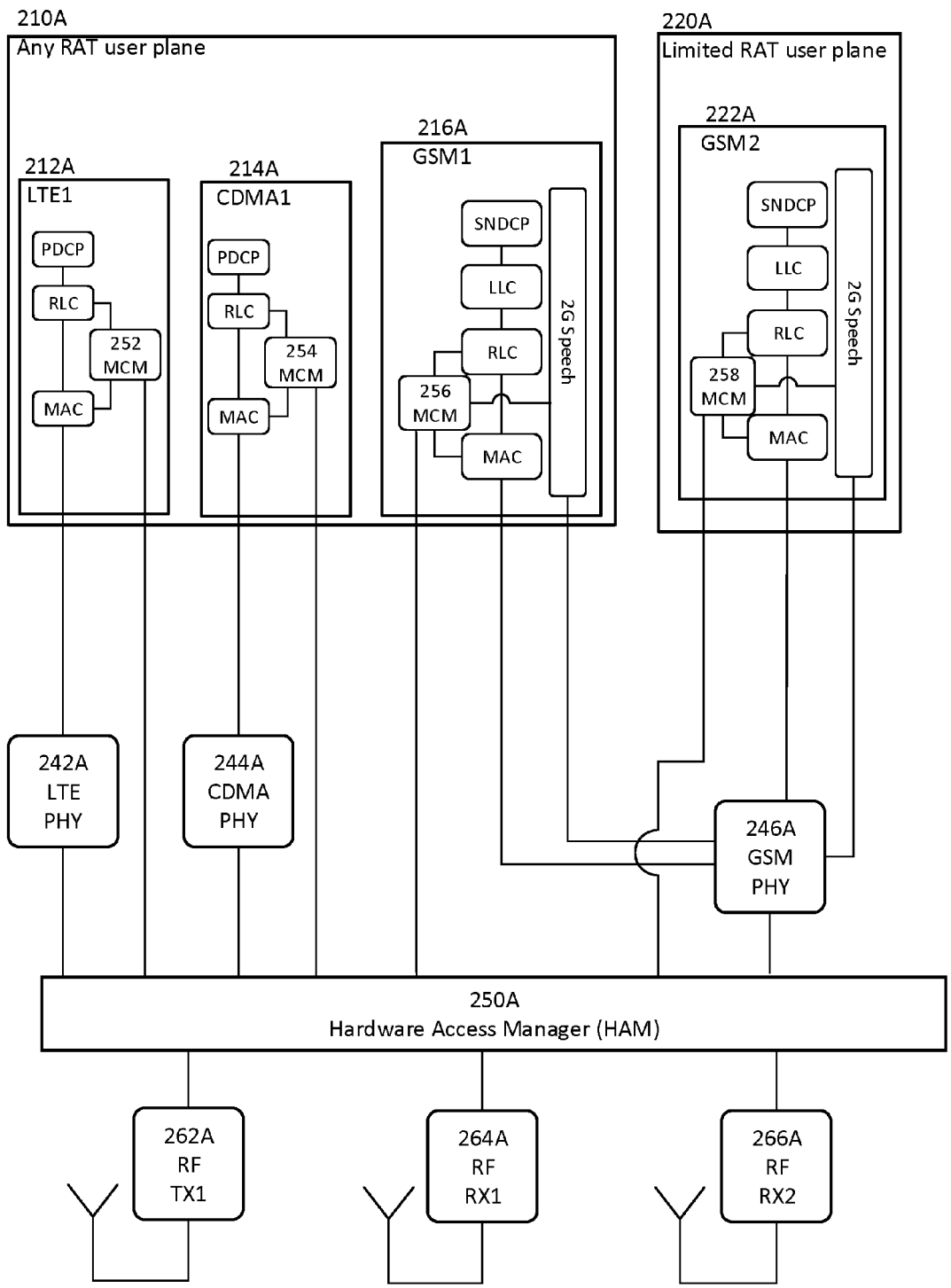
FIG. 2A shows a decentralized framework of a communication device in an aspect of this disclosure.

FIG. 2A shows a decentralized framework 200A of a communication device in an aspect of this disclosure. It is appreciated that framework 200A is exemplary in nature and may thus be simplified for purposes of this explanation. Decentralized framework 200A shares many of the same characteristics of the centralized framework 200 from FIG. 2 and therefore the following description of decentralized framework 200A will instead focus on one notable difference from centralized framework 200: a decentralized MCM operation.

The centralized MCM 230 of FIG. 2 is split into a separate MCM for each RAT protocol stack, i.e. MCM 252 for LTE1 212A, MCM 254 for CDMA1 214A, MCM 256 for GSM1 216A, and MCM 258 for GSM2 222A. This decentralized framework may provide the advantage of easier implementation since it requires less communication between each stack. In other words, the MCM of each respective RAT stack will perform the aforementioned weight calculations for each signal and forward this information to the HAM 250A, which will proceed in a similar manner as the HAM described in FIG. 2.

FIG. 5 shows a flowchart 500 for a Best Antenna Selection (BAS) process. The BAS process may be implemented within the HAM, i.e. within a component of the baseband modem and/or the RF unit. It is appreciated that process 500 is exemplary in nature and may thus be simplified for purposes of this explanation.

As previously recited, if there are multiple RF paths (e.g. antennas) available for each connection, e.g. multiple Rx paths in the UEs depicted in FIGS. 1 and 2, the UE, in an aspect of this disclosure, is configured to implement a BAS procedure as part of the conflict handling. This increases performance by avoiding assigning a high Rx power path to the reception of a robust control channel if another lower weighted TTI may have better use of it.

The BAS procedure may be based on any combination of the following three factors: the signal weight ($W_{MCM(i)}$) for each signal i, the minimum requested signal strength ($SS_{min(i)}$) for each weight, and the available signal power and/or quality ($SS_{actual(j)}$) for each RF path j. The $W_{MCM(i)}$ and the $SS_{min(i)}$ are supplied by the MCM and the $SS_{actual(j)}$ is supplied by measurements from either the PHY layer measurements (such as the LTE PHY 242, CDMA PHY 244, and/or the GSM PHY 246 from FIG. 2) or directly from the RF unit and indicates the estimated signal strength on the given RF connection at the given time.

Flowchart 500 shows an example of the Multi-SIM BAS process in an aspect of this disclosure. In this example, the procedure initiates with a scenario 502 in which signal 2, i.e. $W_{MCM(2)}$, has been assigned a higher weight than signal 1, $W_{MCM(1)}$, through the MCM procedures. In 504, the RF path (e.g. antenna) with the highest power is determined. Since there are two paths available, the instantaneous estimated signal powers are $SS_{actual(1)}$ or $SS_{actual(2)}$ for path 1 and 2, respectively.

If path 1's power, $SS_{actual(1)}$, is higher, the BAS tests 506 whether path 2, i.e. the lower quality path with power $SS_{actual(2)}$, supports the minimum required signal quality for signal 2, i.e. $SS_{min(2)}$. If this is not the case, then signal with weight 2, i.e. $W_{MCM(2)}$, is assigned to the path providing $SS_{actual(1)}$ 530, and the signal with weight 1, i.e. $W_{MCM(1)}$, is assigned to the path providing $SS_{actual(2)}$. If, however, the lower quality path 2 supports the minimum required quality of the highest weight signal 2, i.e. $SS_{min(2)}$ is greater than $SS_{actual(2)}$, then the BAS tests whether $SS_{min(2)}$ is less than $SS_{min(1)}$ in 507. If this is the case, 520, the higher weighted signal, i.e. $W_{MCM(2)}$, is supplied with the worst path, i.e. $SS_{actual(2)}$, and the lower weighted signal, i.e. $W_{MCM(1)}$, is assigned to the better path, i.e. $SS_{actual(1)}$. If, however, $SS_{min(2)}$ is not less than $SS_{min(1)}$, 530, the higher weighted signal, i.e. $W_{MCM(2)}$, is supplied with the better path, i.e. $SS_{actual(1)}$, and the lower weighted signal, i.e. $W_{MCM(1)}$, is assigned to the worse path, i.e. $SS_{actual(2)}$.

A similar process is implemented in the case where the signal power of path 2, i.e. $SS_{actual(2)}$, is greater than the signal power of path 1, i.e. $SS_{actual(1)}$ and is shown in 508, 509, and 540-550 where the path indexes tested are reversed.

Figure 6:
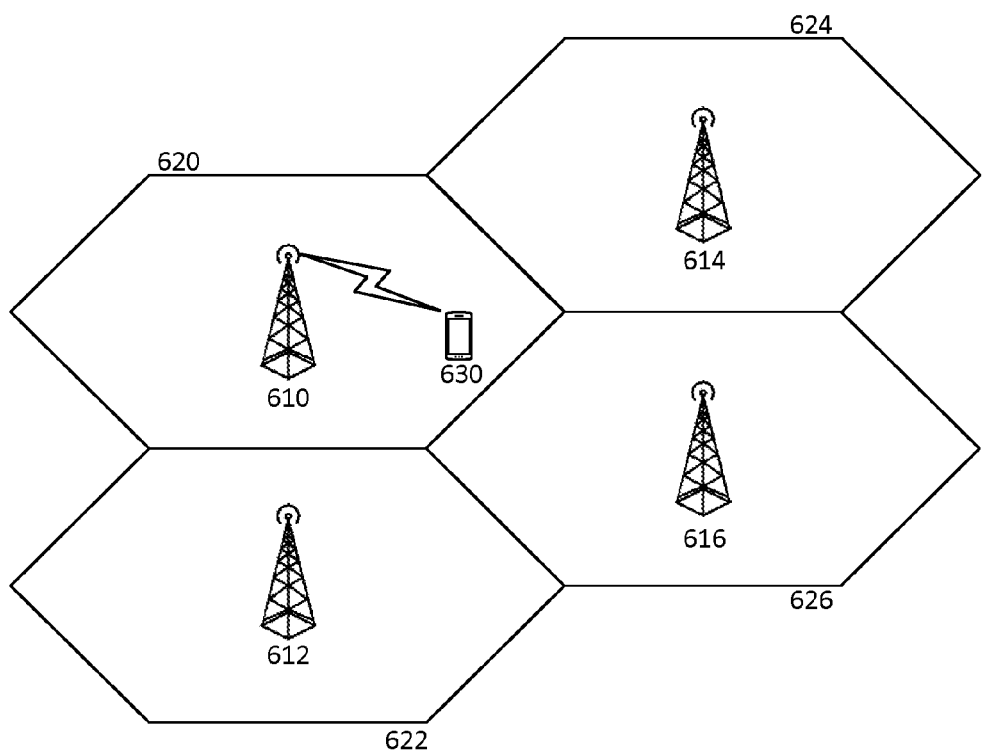
FIG. 6 shows a communication network in an aspect of this disclosure.

FIG. 6 shows a communication network 600 in an aspect of this disclosure. It is appreciated that communication network 600 is exemplary in nature and thus may be simplified for purposes of this explanation.

Communication network 600 consists of a series of cells, 620, 622, 624, and 626. Each cell may have at least one base station 610-616 (e.g. an eNB) serving the cell. Each base station 610-616 is associated with a radio access section of communication network 600, i.e. the Radio Access Network (RAN) of mobile communication network 600. The base stations may thus act as an interface between the RAN of mobile communication network 600 and an underlying core network of mobile communication network 600, and may allow any proximate UE, e.g. UE 630, to exchange data with the core network of mobile communication network 600 and any further networks connected thereto.

Each of base stations 610-616 may respectively provide mobile communication coverage to each its coverage regions, which may correspond to a single cell (i.e. sector) of a respective one of base stations or may be composed of multiple cells (i.e. sectors) of a respective one of base station. As shown in FIG. 6, for example, UE 630 may be physically located within cell 620 of base station 610. It is appreciated that although the coverage regions (i.e. the cells) are depicted as having distinct boundaries, it is understood that one or more of coverage regions may overlap, and accordingly there may exist geographical regions served by two or more of base stations 610-616.

Communication Network 600 may be configured in accordance with the network architecture of any one of, or any combination of, LIE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. Accordingly, base stations 610-616 may be configured to provide an interface for communication devices, such as UE 630, to connect with any of the aforementioned network architectures.

LE 630 may be able to access communication network 600 through one or more of base stations 610-616 and/or through one or more RATs. Accordingly, UE 630 is configured as described herein in order to maximize performance.

UE 630 may have an internal configuration similar to that shown in FIG. 1 and/or may implement a framework similar to the framework exhibited in FIG. 2. Furthermore, UE 630 may be configured to perform all the processes disclosed herein, e.g. modification of an initial weight to achieve a true, real-time weight of a signal or the BAS procedure described in FIG. 5.

FIG. 7 shows a flowchart 700 in an aspect of this disclosure. It is appreciated that flowchart 700 is exemplary in nature and may thus be simplified for purposes of this explanation. Flowchart 700 outlines the process by which a communication device may assign access to its RF unit among a plurality of signals.

In 702, a static weight (i.e. initial weight) is assigned to each of signal. For example, a static weight in accordance with the examples shown in table 300 in FIG. 3 can be assigned to each respective signal, e.g. an initial weight ($W_{init}$) of 7 to a PCCH signal. In 704, a true weight for each signal is calculated by modifying the static weight with a dynamic value. The dynamic value may be at least one of a performance consideration value and/or a signal status value. The true weight may be calculated, for example, from equation (1).

In 706, the signal with the highest true weight is determined. This signal may have been the signal with the highest initial weight, or another signal whose true weight exceeded that of an initially higher weighted signal after undergoing the modification of 704.

In 708, the signal with the highest true weight value is provided access to the RF unit of the device.

FIG. 8 shows a flowchart 800 in an aspect of this disclosure. It is appreciated that flowchart 800 is exemplary in nature and may thus be simplified for purposes of this explanation.

In 802, each signal is assigned a weight, wherein the weight of each signal is relative to the signal's priority. Each signal's weight may be determined, for example, by modifying a static (i.e. initial) weight based on at least one of a performance consideration factor or signal status factor as disclosed herein.

In 804, a signal with a higher weight is determined.

In 806, the signal power for each antenna is detected and a first antenna with a lower signal power is determined.

In 808, a minimum signal power needed to transmit or receive the signal with the higher weight is determined. This minimal signal power determination may also be performed at any point from 802 to 806.

In 810, if the minimum signal power needed for the signal with the higher weight is greater than the lower signal power of the first antenna measured in 806, a second antenna with a higher signal power than the antenna with the lower signal power is selected to transmit/receive the signal with the higher weight.

In Example 1, A method for a device to provide access to a radio frequency (RF) unit of the device, comprising assigning a static weight (i.e. an initial weight) value to each of a plurality of signals; calculating a true weight value for each signal comprising modifying the static weight value with a dynamic value, wherein the dynamic value is based on at least one of a performance consideration value or a signal status value; determining a signal with a highest true weight value from the plurality of signals; and providing the signal with the highest true weight value access to the RF unit.

In Example 2, the subject matter of example 1 may further include wherein the device comprises a plurality of subscriber identify modules (SIMs).

In Example 3, the subject matter of example 2 may further include wherein at least one of the plurality of SIMs is configured to support a plurality of radio access technologies (RATs).

In Example 4, the subject matter of examples 1-3 may further include providing a signal from at least one of the following with access to the RF unit: Bluetooth, WiFi, or a Near Field Communication (NFC).

In Example 5, the subject matter of examples 1-4 may further include obtaining the static weight value for each of the plurality of signals from a predetermined data.

In Example 6, the subject matter of example 5 may further include wherein the predetermined data comprises a table, chart, or list.

In Example 7, the subject matter of examples 1-6 may further include storing the predetermined data in a memory component of the device.

In Example 8, the subject matter of examples 1-7 may further include wherein the performance consideration value comprises a probability of reception or transmission of the signal.

In Example 9, the subject matter of examples 1-8 may further include wherein the performance consideration value is a value ranging from x to y, wherein x is a value based on a minimal desired value of the true weight and y is a value based on a maximum desired value of the true weight.

In Example 10, the subject matter of examples 1-9 may further include wherein the signal status value of each signal is calculated based on a signal history of each signal.

In Example 11, the subject matter of examples 1-10 may further include wherein the signal status value comprises a value ranging from 1 to 15.

In Example 12, the subject matter of examples 1-7 may further include wherein calculating the true weight value of each signal further comprises using a formula:

$$W_{true}(i)=W_{init}*\delta*\alpha$$

where $W_{true}$ is the true weight, $W_{init}$ is the static weight value assigned to each signal, $\delta$ is a probability of data reception or transmission, and $\alpha$ is a value calculated from a history of the previous transmissions of the signal.

In Example 13, the subject matter of example 12 may include wherein $\delta$ is a value ranging from about 0 to about 1.

In Example 14, the subject matter of examples 12-13 may include wherein $\alpha$ is a value ranging from about 1 to about 15.

In Example 15, the subject matter of examples 12-14 may include where $\delta$ is determined by the formula $$\delta=1-\exp((\lambda-1)g)$$

where $\lambda$ is a probability of the reception of the signal at a base station or at the device and g is a signal gain.

In Example 16, the subject matter of examples 12-14 may include where δ is determined by the formula:

$$\delta = \begin{cases} 1, & \text{if } P_{success} \geq P_{limit} \\ b, & \text{otherwise} \end{cases}$$

where b is a value greater than 0 but less than 1, $P_{success}$ is a probability of successfully communicating the signal and $P_{limit}$ is a minimal value based on the device's requirements.

In Example 17, the subject matter of examples 12-16 may include where α is determined by the formula:

$$\alpha = 1 + N_{missed}$$

where $N_{missed}$ is a number of times the signal has been missed.

In Example 18, the subject matter of examples 12-16 may include where α is determined by the formula:

$$\alpha = \begin{cases} 1, & P(T_{next} < T_{max} | T_d) < P_{min} \\ y, & P(T_{next} < T_{max} | T_d) \geq P_{min} \end{cases}$$

where y is a value greater than 1, $P(T_{next}<T_{max}|T_d)$ is a probability that a data will be discarded before a time needed to make a next transmission, $T_{next}$, will be scheduled to occur later than a maximum retransmission, $T_{max}$, based on a current delay, $T_d$, and $P_{min}$ is a minimum loss rate defined by a Quality of Service Class Identifier.

In Example 19, the subject matter of example 18 may include wherein the value of y is about 15 or less.

In Example 20, a method for a device with multiple antennas to select from which antenna to transmit or receive each of a plurality of signals, comprising: assigning a weight to each signal, wherein the weight of each signal is relative to the signal's priority; determining a signal with a higher weight; detecting a signal power for each antenna and determining a first antenna with a lower signal power; determining a minimum signal power needed to transmit or receive the signal with the higher weight; and wherein if the minimum signal power needed for the signal with the higher weight is greater than or equal to the lower signal power, selecting a second antenna with a higher signal power to transmit or receive the signal with the higher weight.

In Example 21, the subject matter of example 20 may include the device including multiple subscriber identity modules (SIMs).

In Example 22, the subject matter of examples 20-21 may include providing a signal from at least one of the following with access to the RF unit: Bluetooth, WiFi, or a Near Field Communication (NFC).

In Example 23, the subject matter of examples 20-22 may include assigning the first antenna with the lower signal power to a signal with a lower weight.

In Example 24, the subject matter of examples 20-22 may include wherein if the minimum signal power needed for the signal with the higher weight is less than the lower signal power, further comprising: comparing the minimum signal power needed for the signal with the higher weight to a minimum signal power needed for a signal with a lower weight, wherein if the minimum signal power needed for the signal with the lower weight is lower, assigning the second antenna with a higher signal power to the signal with the higher weight.

In Example 25, the subject matter of example 24 may include further comprising wherein if the minimum signal power needed for the signal with the lower weight is greater, assigning the first antenna with the lower signal power to the signal with the higher weight and the second antenna with the higher signal power to the signal with the lower weight.

In Example 26, the subject matter of examples 20-25 may include wherein the plurality of signals comprises at least two signals.

In Example 27, the subject matter of examples 20-26 may include wherein the plurality of antennas comprises at least two antennas.

In Example 28, the subject matter of examples 20-2.8 may include further comprising determining the signal weights and the minimum signal powers with a multi-SIM control manager and determining the signal powers of the antennas with a hardware access manager.

In Example 29, the subject matter of example 28 may include connecting the multi-SIM control manager and the hardware access manager to facilitate a two way communication in between.

In Example 30, the subject matter of examples 28-29 may include implementing the multi-SIM control manager into a baseband modem of the device.

In Example 31, the subject matter of examples 28-30 may include implementing the hardware access manager into the baseband modem of the device.

In Example 32, the subject matter of examples 28-30 may include further comprising implementing the hardware access manager into a radio frequency unit of the device.

In Example 33, the subject matter of examples 28-30 may include further comprising connecting the multiple antennas to the hardware access manager.

In Example 34, a method for a multi-subscriber identity module (SIM) device to provide access to a radio frequency (RF) unit of the device, comprising: assigning a static weight (i.e. initial weight) value to each of a plurality of signals; calculating a true weight value for each signal comprising modifying the static weight value with a dynamic value; determining a signal with a highest true weight value from the plurality of signals; and providing the signal with the highest true weight value access to the RF unit of the device.

In Example 35, the subject matter of example 34 may include wherein the dynamic value is based on at least one of a performance consideration value or a signal status value.

In Example 36, the subject matter of examples 34-35 may include wherein at least one of the plurality of SIMs is configured to support a plurality of radio access technologies (RATs).

In Example 37, the subject matter of examples 34-36 may include further comprising obtaining the static weight value for each of the plurality of signals from a predetermined data In Example 38, the subject matter of example 37 may include wherein the predetermined data comprises a table, chart, or list.

In Example 39, the subject matter of examples 37-38 may include further comprising storing the predetermined data in a memory component of the device.

In Example 40, the subject matter of examples 35-39 may include wherein the performance consideration value comprises a probability of reception or transmission of the signal.

In Example 41, the subject matter of examples 34-40 may include wherein the performance consideration value is a value ranging from x to y, wherein x is a value based on a minimal desired value of the true weight and y is a value based on a maximum desired value of the true weight.

In Example 42, the subject matter of examples 34-41 may include wherein the signal status value of each signal is calculated based on a signal history of each signal.

In Example 43, the subject matter of examples 39-42 may include wherein the signal status value comprises a value ranging from 1 to 15.

In Example 44, the subject matter of examples 34-38 may include wherein calculating the true weight value of each signal further comprises using a formula:

$$W_{true}(i)=W_{init}*\delta*\alpha$$

where $W_{true}$ is the true weight, $W_{init}$ is the static weight value assigned to each signal, $\delta$ is a probability of data reception or transmission, and $\alpha$ is a value calculated from a history of the previous transmissions of the signal.

In Example 45, the subject matter of example 44 may include wherein $\delta$ is a value ranging from about 0 to about 1.

In Example 46, the subject matter of examples 44-45 may include wherein $\alpha$ is a value ranging from about 1 to about 15.

In Example 47, the subject matter of examples 44-46 may include where $\delta$ is determined by the formula $$\delta=1-\exp((\lambda-1)g)$$

where $\lambda$ is a probability of the reception of the signal at a base station or at the device and g is a signal gain.

In Example 48, the subject matter of examples 44-46 may include where $\delta$ is determined by the formula:

$$\delta = \begin{cases} 1, & \text{if } P_{success} \geq P_{limit} \\ b, & \text{otherwise} \end{cases}$$

where b is a value greater than 0 but less than 1, $P_{success}$ is a probability of successfully communicating the signal and $P_{limit}$ is a minimal value based on the device's requirements.

In Example 49, the subject matter of examples 44-48 may include where $\alpha$ is determined by the formula:

$$\alpha=1+N_{missed}$$

where $N_{missed}$ is a number of times the signal has been missed.

In Example 50, the subject matter of examples 44-48 may include where $\alpha$ is determined by the formula:

$$\alpha = \begin{cases} 1, & P(T_{next} < T_{max} | T_d) < P_{min} \\ y, & P(T_{next} < T_{max} | T_d) \geq P_{min} \end{cases}$$

where y is a value greater than 1, $P(T_{next}<T_{max}|T_d)$ is a probability that a data will be discarded before a time needed to make a next transmission, $T_{next}$, will be scheduled to occur later than a maximum retransmission, $T_{max}$, based on a current delay, $T_d$, and $P_{min}$ is a minimum loss rate defined by a Quality of Service Class Identifier.

In Example 51, the subject matter of example 50 may include wherein the value of y is about 20 or less.

In Example 52, the subject matter of example 51 may include wherein the value of y is about 15 or less.

In Example 53, a device configured to provide access to a radio frequency (RF) unit of the device, comprising: the RF unit configured to receive or transmit a plurality of signals; a baseband modem configured to: assign a static weight (i.e. initial weight) to each of the plurality of signals; calculate a true weight value for each signal comprising modifying the static weight value with a dynamic value, wherein the dynamic value is based on at least one of a performance consideration value or a signal status value; determine a signal with a highest true weight value from the plurality of signals; and provide the signal with the highest true weight value access to the RF unit of the device.

In Example 54, the subject matter of example 53 may include the device further comprising a plurality of subscriber identify modules (SIMs).

In Example 55, the subject matter of example 54 may include wherein a first SIM of the plurality of SIMs is configured to support multiple radio access technologies (RATs).

In Example 56, the subject matter of examples 54-55 may include wherein at least one SIM is configured to support a single radio access technology (RAT).

In Example 57, the subject matter of examples 53-56 may include the device further configured to support at least one of the following signals: Bluetooth, WiFi, or Near Field Communication (NFC), wherein the baseband modem is further configured to determine a true weight for the respective signal.

In Example 58, the subject matter of examples 53-57 may include the baseband modem further configured to obtain the static weight value for each of the plurality of signals from a predetermined data.

In Example 59, the subject matter of example 58 may include wherein the predetermined data comprises a table, chart, or list.

In Example 60, the subject matter of examples 58-59 may include wherein the predetermined data is stored in a memory component of the device.

In Example 61, the subject matter of examples 53-60 may include wherein the dynamic value is based on the performance consideration value and the signal history status value.

In Example 62, the subject matter of examples 53-61 may include wherein the performance consideration value comprises a probability of reception or transmission of the signal.

In Example 63, the subject matter of examples 53-62 may include wherein the performance consideration value is a value ranging from x to y, wherein x is a value based on a minimal desired value of the true weight and y is a value based on a maximum desired value of the true weight.

In Example 64, the subject matter of examples 53-63 may include wherein the signal status value of each signal is calculated based on a signal history of each signal.

In Example 65, the subject matter of examples 53-64 may include wherein the signal status value comprises a value ranging from about 1 to about 15.

In Example 66, the subject matter of examples 53-60 may include the baseband modem further configured to calculate the true weight of each signal using a formula:

$$W_{true}(i)=W_{init}*\delta*\alpha$$

where $W_{true}$ is the true weight, $W_{init}$ is the static weight value assigned to each signal, $\delta$ is a probability of data reception or transmission, and $\alpha$ is a value calculated from a history of the previous transmissions of the signal.

In Example 67, the subject matter of example 66 may include wherein $\delta$ is a value ranging from about 0 to about 1.

In Example 68, the subject matter of examples 66-67 may include wherein $\alpha$ is a value ranging from about 1 to about 15.

In Example 69, the subject matter of examples 66-68 may include the baseband modem further configured to determine δ with a formula:

$$\delta = 1 - \exp((\lambda-1)g)$$

where λ is a probability of the reception of the signal at a base station or at the device and g is a signal gain.

In Example 70, the subject matter of examples 66-68 may include the baseband modem further configured to determine δ with a formula:

$$\delta = \begin{cases} 1, & \text{if } P_{success} \geq P_{limit} \\ b, & \text{otherwise} \end{cases}$$

where b is a value greater than 0 but less than 1, $P_{success}$ is a probability of successfully communicating the signal and $P_{limit}$ is a minimal value based on the device's requirements.

In Example 71, the subject matter of examples 66-70 may include the baseband modem further configured to determine α with a formula:

$$\alpha = 1 + N_{missed}$$

where $N_{missed}$ is a number of times the signal has been missed.

In Example 72, the subject matter of examples 66-70 may include the baseband modem further configured to determine α with a formula:

$$\alpha = \begin{cases} 1, & P(T_{next} < T_{max} | T_d) < P_{min} \\ y, & P(T_{next} < T_{max} | T_d) \geq P_{min} \end{cases}$$

where y is a value greater than 1, $P(T_{next}<T_{max}|T_d)$ is a probability that a data will be discarded before a time needed to make a next transmission, $T_{next}$, will be scheduled to occur later than a maximum retransmission, $T_{max}$, based on a current delay, $T_d$, and $P_{min}$ is a minimum loss rate defined by a Quality of Service Class Identifier.

In Example 73, the subject matter of example 72 may include wherein the value of y is about 15 or less.

In Example 74, a device with multiple antennas configured to select from which antenna to transmit or receive each of a plurality of signals, comprising: a radio frequency (RF) unit comprising the multiple antennas configured to transmit or receive each of the plurality of signals and detect a signal power for each antenna; a baseband modem configured to: assign a weight to each signal, wherein the weight of each signal is relative to the signal's priority; determine a signal with a higher weight; receive the signal power for each of the multiple antennas from the RF unit and determine a first antenna with a lower signal power; determine a minimum signal power needed to transmit or receive the signal with the higher weight; and wherein if the minimum signal power needed for the signal with the higher weight is greater than or equal to the lower signal power, select a second antenna with a higher signal power to transmit or receive the signal with the higher weight.

In Example 75, the subject matter of example 74 may include the baseband modem further configured to assign the first antenna with the lower signal power to a signal with a lower weight.

In Example 76, the subject matter of examples 74-75 may include wherein if the minimum signal power needed for the signal with the higher weight is less than the lower signal power, the baseband modem further configured to compare the minimum signal power needed for the signal with the higher weight to a minimum signal power needed for a signal with a lower weight, wherein if the minimum signal power needed for the signal with the lower weight is lower, assign the second antenna with a higher signal power to the signal with the higher weight.

In Example 77, the subject matter of example 76 may include wherein if the minimum signal power needed for the signal with the lower weight is greater, the baseband modem further configured to assign the first antenna with the lower signal power to the signal with the higher weight and the second antenna with the higher signal power to the signal with the lower weight.

In Example 78, the subject matter of examples 74-77 may include the baseband modem further configured to determine the signal weights and the minimum signal powers with at least one multi-SIM control manager.

In Example 79, the subject matter of examples 74-78 may include the baseband modem further configured to determine the signal powers of the antennas with a hardware access manager.

In Example 80, the subject matter of examples 74-79 may include the RF unit further configured to determine the signal powers of the antennas with a hardware access manager.

In Example 81, the subject matter of example 80 may include further comprising a connection to facilitate a two way communication between the at least one multi-SIM control manager and the hardware access manager.

In Example 82, the subject matter of examples 74-81 may include further comprising a first subscriber identify module (SIM) configured to support multiple radio access technologies (RATs).

In Example 83, the subject matter of examples 74-82 may include further comprising an additional SIM configured to support a single radio access technology (RAT).

In Example 84, a multi-subscriber identity module (SIM) device configured to provide access to a radio frequency (RF) unit of the device, comprising: the RF unit configured to transmit or receive each of the plurality of signals; and a baseband modem configured to: assign a static weight (i.e. initial weight) value to each of a plurality of signals; calculate a true weight value for each signal comprising modifying the static weight value with a dynamic value; determine a signal with a highest true weight value from the plurality of signals; and provide the signal with the highest true weight value access to the RF unit of the device.

In Example 85, the subject matter of example 84 may include wherein the dynamic value is based on at least one of a performance consideration value or a signal status value.

In Example 86, the subject matter of examples 84-85 may include wherein at least one of the plurality of SIMs is configured to support a plurality of radio access technologies (RATs).

In Example 87, the subject matter of examples 84-86 may include the RF unit further configured to support at least one of Bluetooth, Wifi, or Near Field Communication (NFC) and the baseband modem further configured to calculate a true weight value for the respective signal.

In Example 88, the subject matter of examples 84-87 may include further comprising obtaining the static weight value for each of the plurality of signals from a predetermined data.

In Example 89, the subject matter of example 88 may include wherein the predetermined data comprises a table, chart, or list.

In Example 90, the subject matter of examples 88-89 may include further comprising storing the predetermined data in a memory component of the device.

In Example 91, the subject matter of examples 85-90 may include wherein the performance consideration value comprises a probability of reception or transmission of the signal.

In Example 92, the subject matter of examples 85-91 may include wherein the performance consideration value is a value ranging from x to y, wherein x is a value based on a minimal desired value of the true weight and y is a value based on a maximum desired value of the true weight.

In Example 93, the subject matter of examples 85-90 may include wherein the signal status of each signal is calculated based on a signal history of each signal.

In Example 94, the subject matter of examples 88-89 may include wherein the signal status comprises a value ranging from 1 to 15.

In Example 95, the subject matter of examples 84-90 may include wherein calculating the true weight value of each signal further comprises using a formula:

$$W_{true}(i) = W_{init} * \delta * \alpha$$

where $W_{true}$ is the true weight, $W_{init}$ is the static weight value assigned to each signal, $\delta$ is a probability of data reception or transmission, and $\alpha$ is a value calculated from a history of the previous transmissions of the signal.

In Example 96, the subject matter of example 95 may include wherein $\delta$ is a value ranging from about 0 to about 1.

In Example 97, the subject matter of examples 95-96 may include wherein $\alpha$ is a value ranging from about 1 to about 15.

In Example 98, the subject matter of examples 95-97 may include where $\delta$ is determined by the formula $$\delta = 1 - \exp((\lambda - 1)g)$$

where $\lambda$ is a probability of the reception of the signal at a base station or at the device and g is a signal gain.

In Example 99, the subject matter of examples 95-97 may include where $\delta$ is determined by the formula:

$$\delta = \begin{cases} 1, & \text{if } P_{success} \geq P_{limit} \\ b, & \text{otherwise} \end{cases}$$

where b is a value greater than 0 but less than 1, $P_{success}$ is a probability of successfully communicating the signal and $P_{limit}$ is a minimal value based on the device's requirements.

In Example 100, the subject matter of examples 95-99 may include where $\alpha$ is determined by the formula:

$$\alpha = 1 + N_{missed}$$

where $N_{missed}$ is a number of times the signal has been missed.

In Example 101, the subject matter of examples 95-99 may include where $\alpha$ is determined by the formula:

$$\alpha = \begin{cases} 1, & P(T_{next} < T_{max} | T_d) < P_{min} \\ y, & P(T_{next} < T_{max} | T_d) \geq P_{min} \end{cases}$$

where y is a value greater than 1, $P(T_{next} < T_{max} | T_d)$ is a probability that a data will be discarded before a time needed to make a next transmission, $T_{next}$, will be scheduled to occur later than a maximum retransmission, $T_{max}$, based on a current delay, $T_d$, and $P_{min}$ is a minimum loss rate defined by a Quality of Service Class Identifier.

In Example 102, the subject matter of examples 101 may include wherein the value of y is about 20 or less.

In Example 103, the subject matter of examples 101 may include wherein the value of y is about 15 or less.

In Example 104, a non-transitory computer readable medium with program instructions, when executed, to cause a processor of a device to provide access to a radio frequency (RF) unit of the device, comprising assigning an statoc weight value to each of a plurality of signals; calculating a true weight value for each signal comprising modifying the static weight (i.e. initial weight) value with a dynamic value, wherein the dynamic value is based on at least one of a performance consideration value or a signal status value; determining a signal with a highest true weight value from the plurality of signals; and providing the signal with the highest true weight value access to the RF unit of the device.

In Example 105, the subject matter of example 104 may further include wherein the device comprises a plurality of subscriber identify modules (SIMs).

In Example 106 the subject matter of example 105 may further include wherein at least one of the plurality of SIMs is configured to support a plurality of radio access technologies (RATs).

In Example 107 the subject matter of examples 104-106 may further include providing a signal from at least one of the following with access to the RF unit: Bluetooth, WiFi, or a Near Field Communication (NFC).

In Example 108, the subject matter of examples 104-107 may further include obtaining the static weight value for each of the plurality of signals from a predetermined data.

In Example 109, the subject matter of example 108 may further include wherein the predetermined data comprises a table, chart, or list.

In Example 110, the subject matter of examples 108-109 may further include storing the predetermined data in a memory component of the device.

In Example 111 the subject matter of examples 104-110 may further include wherein the performance consideration value comprises a probability of reception or transmission of the signal.

In Example 112, the subject matter of examples 104-111 may further include wherein the performance consideration value is a value ranging from x to y, wherein x is a value based on a minimal desired value of the true weight and y is a value based on a maximum desired value of the true weight.

In Example 113, the subject matter of examples 104-112 may further include wherein the signal status value of each signal is calculated based on a signal history of each signal.

In Example 114, the subject matter of examples 104-113 may further include wherein the signal status value comprises a value ranging from 1 to 15.

In Example 115, the subject matter of examples 104-110 may further include wherein calculating the true weight value of each signal further comprises using a formula:

$$W_{true}(i) = W_{init} * \delta * \alpha$$

where $W_{true}$ is the true weight, $W_{init}$ is the static weight value assigned to each signal, $\delta$ is a probability of data reception or transmission, and $\alpha$ is a value calculated from a history of the previous transmissions of the signal.

In Example 116, the subject matter of example 115 may include wherein δ is a value ranging from about 0 to about 1.

In Example 117, the subject matter of examples 5-116 may include wherein α is a value ranging from about 1 to about 15.

In Example 118, the subject matter of examples 115-117 may include where δ is determined by the formula $$\delta = 1 - \exp((\lambda - 1)g)$$

where λ is a probability of the reception of the signal at a base station or at the device and g is a signal gain.

In Example 119, the subject matter of examples 115-117 may include where δ is determined by the formula:

$$\delta = \begin{cases} 1, & \text{if } P_{success} \geq P_{limit} \\ b, & \text{otherwise} \end{cases}$$

where b is a value greater than 0 but less than 1, $P_{success}$ is a probability of successfully communicating the signal and $P_{limit}$ is a minimal value based on the device's requirements.

In Example 120, the subject matter of examples 115-119 may include where α is determined by the formula:

$$\alpha = 1 + N_{missed}$$

where $N_{missed}$ is a number of times the signal has been missed.

In Example 121, the subject matter of examples 115-119 may include where α is determined by the formula:

$$\alpha = \begin{cases} 1, & P(T_{next} < T_{max} | T_d) < P_{min} \\ y, & P(T_{next} < T_{max} | T_d) \geq P_{min} \end{cases}$$

where y is a value greater than 1, $P(T_{next}<T_{max}|T_d)$ is a probability that a data will be discarded before a time needed to make a next transmission, $T_{next}$, will be scheduled to occur later than a maximum retransmission, $T_{max}$, based on a current delay, $T_d$, and $P_{min}$ is a minimum loss rate defined by a Quality of Service Class Identifier.

In Example 122, the subject matter of example 121 may include wherein the value of y is about 15 or less.

In Example 123, a non-transitory computer readable medium with program instructions, when executed, to cause a processor of a device with multiple antennas to select from which antenna to transmit or receive each of a plurality of signals, comprising: assigning a weight to each signal, wherein the weight of each signal is relative to the signal's priority; determining a signal with a higher weight; detecting a signal power for each antenna and determining a first antenna with a lower signal power; determining a minimum signal power needed to transmit or receive the signal with the higher weight; and wherein if the minimum signal power needed for the signal with the higher weight is greater than or equal to the lower signal power, selecting a second antenna with a higher signal power to transmit or receive the signal with the higher weight.

In Example 124, the subject matter of examples 123 may include assigning the first antenna with the lower signal power to a signal with a lower weight.

In Example 125, the subject matter of examples 123-124 may include wherein if the minimum signal power needed for the signal with the higher weight is less than the lower signal power, further comprising: comparing the minimum signal power needed for the signal with the higher weight to a minimum signal power needed for a signal with a lower weight, wherein if the minimum signal power needed for the signal with the lower weight is lower, assigning the second antenna with a higher signal power to the signal with the higher weight.

In Example 126, the subject matter of example 125 may include further comprising wherein if the minimum signal power needed for the signal with the lower weight is greater, assigning the first antenna with the lower signal power to the signal with the higher weight and the second antenna with the higher signal power to the signal with the lower weight.

In Example 127, the subject matter of examples 123-126 may include wherein the plurality of signals comprises at least two signals.

In Example 128, the subject matter of examples 123-127 may include wherein the plurality of antennas comprises at least two antennas.

In Example 129, the subject matter of examples 123-128 may include further comprising determining the signal weights and the minimum signal powers with a multi-SIM control manager and determining the signal powers of the antennas with a hardware access manager.

In Example 130, the subject matter of example 129 may include connecting the multi-SIM control manager and the hardware access manager to facilitate a two way communication in between.

In Example 131, the subject matter of examples 129-130 may include implementing the multi-SIM control manager into a baseband modem of the device.

In Example 132, the subject matter of examples 129-131 may include implementing the hardware access manager into the baseband modem of the device.

In Example 133, the subject matter of examples 129-132 may include further comprising implementing the hardware access manager into a radio frequency unit of the device.

In Example 134, the subject matter of examples 129-133 may include further comprising connecting the multiple antennas to the hardware access manager.

In Example 135, a non-transitory computer readable medium with programmable instructions when executed cause a processor of a multi-subscriber identity module (SIM) device to provide access to a radio frequency (RF) unit of the device, comprising: assigning a static weight (i.e. initial weight) value to each of a plurality of signals; calculating a true weight value for each signal comprising modifying the static weight value with a dynamic value; determining a signal with a highest true weight value from the plurality of signals; and providing the signal with the highest true weight value access to the RF unit of the device.

In Example 136, the subject matter of example 135 may include wherein the dynamic value is based on at least one of a performance consideration value or a signal status value.

In Example 137, the subject matter of examples 135-136 may include wherein at least one of the plurality of SIMs is configured to support a plurality of radio access technologies (RATs).

In Example 138, the subject matter of examples 135-137 may include further comprising providing a signal from at least one of the following with access to the RF unit: Bluetooth, WiFi, or a Near Field Communication (NFC).

In Example 139, the subject matter of example 133 may include obtaining the static weight value for each of the plurality of signals from a predetermined data.

In Example 140, the subject matter of example 139 may include wherein the predetermined data comprises a table, chart, or list.

In Example 141, the subject matter of examples 139-140 may include further comprising storing the predetermined data in a memory component of the device.

In Example 142, the subject matter of examples 136-141 may include wherein the performance consideration value comprises a probability of reception or transmission of the signal.

In Example 143, the subject matter of examples 136-142 may include wherein the performance consideration value is a value ranging from x to y, wherein x is a value based on a minimal desired value of the true weight and y is a value based on a maximum desired value of the true weight.

In Example 144, the subject matter of examples 136-143 may include wherein the signal status value of each signal is calculated based on a signal history of each signal.

In Example 145, the subject matter of examples 136-144 may include wherein the signal status value comprises a value ranging from about 1 to about 15.

In Example 146, the subject matter of examples 135-141 may include wherein calculating the true weight value of each signal further comprises using a formula:

$$W_{true}(i) = W_{init} * \delta * \alpha$$

where $W_{true}$ is the true weight, $W_{init}$ is the static weight value assigned to each signal, $\delta$ is a probability of data reception or transmission, and $\alpha$ is a value calculated from a history of the previous transmissions of the signal.

In Example 147, the subject matter of example 146 may include wherein $\delta$ is a value ranging from about 0 to about 1.

In Example 148, the subject matter of examples 146-147 may include wherein $\alpha$ is a value ranging from about 1 to about 15.

In Example 149, the subject matter of examples 146-148 may include where $\delta$ is determined by the formula $$\delta = 1 - \exp((\lambda-1)g)$$

where $\lambda$ is a probability of the reception of the signal at a base station or at the device and $g$ is a signal gain.

In Example 150, the subject matter of examples 146-148 may include where $\delta$ is determined by the formula:

$$\delta = \begin{cases} 1, & \text{if } P_{success} \geq P_{limit} \\ b, & \text{otherwise} \end{cases}$$

where b is a value greater than 0 but less than 1, $P_{success}$ is a probability of successfully communicating the signal and $P_{limit}$ is a minimal value based on the device's requirements.

In Example 151, the subject matter of examples 146-150 may include where $\alpha$ is determined by the formula:

$$\alpha = 1 + N_{missed}$$

where $N_{missed}$ is a number of times the signal has been missed.

In Example 152, the subject matter of examples 146-150 may include where $\alpha$ is determined by the formula:

$$\alpha = \begin{cases} 1, & P(T_{next} < T_{max} | T_d) < P_{min} \\ y, & P(T_{next} < T_{max} | T_d) \geq P_{min} \end{cases}$$

where y is a value greater than 1, $P(T_{next} < T_{max} | T_d)$ is a probability that a data will be discarded before a time needed to make a next transmission, $T_{next}$, will be scheduled to occur later than a maximum retransmission, $T_{max}$, based on a current delay, $T_d$, and $P_{min}$ is a minimum loss rate defined by a Quality of Service Class Identifier.

In Example 153, the subject matter of example 152 may include wherein the value of y is about 20 or less.

In Example 154, the subject matter of example 152 may include wherein the value of y is about 15 or less.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A multi-subscriber identity module (SIM) device configured to provide access to a radio frequency (RF) unit of the device, comprising:
   the RF unit configured to transmit or receive each of a plurality of signals; and
   a baseband modem configured to:
   assign a static weight value to each of the plurality of signals;
   calculate a true weight value for each signal comprising modifying the static weight value with a dynamic value;
   determine a signal with a highest true weight value from the plurality of signals; and
   provide the signal with the highest true weight value access to the RF unit of the device.

2. The device of claim 1, wherein the dynamic value is based on at least one of a performance consideration value or a signal status value.

3. The device of claim 2, wherein the performance consideration value comprises a probability of reception or transmission of the signal.

4. The device of claim 2, wherein the signal status of each signal is calculated based on a signal history of each signal.

5. The device of claim 2, wherein calculating the true weight value of each signal further comprises using a formula:

$$W_{true}(i) = W_{init} * \delta * \alpha$$

where $W_{true}$ is the true weight, $W_{init}$ is the static weight value assigned to each signal, $\delta$ is a probability of data reception or transmission, and $\alpha$ is a value calculated from a history of the previous transmissions of the signal.

6. The device of claim 5, where $\delta$ is determined by the formula $$\delta = 1 - \exp((\lambda-1)g)$$

where $\lambda$ is a probability of the reception of the signal at a base station or at the device and $g$ is a signal gain.

7. The device of claim 5, where δ is determined by the formula:

$$\delta = \begin{cases} 1, & \text{if } P_{success} \geq P_{limit} \\ b, & \text{otherwise} \end{cases}$$

where b is a value greater than 0 but less than 1, $P_{success}$ is a probability of successfully communicating the signal and $P_{limit}$ is a minimal value based on the device's requirements.

8. The device of claim 5, where α is determined by the formula:

$$\alpha = 1 + N_{missed}$$

where $N_{missed}$ is a number of times the signal has been missed.

9. The device of claim 5, where α is determined by the formula:

$$\alpha = \begin{cases} 1, & P(T_{next} < T_{max} \mid T_d) < P_{min} \\ y, & P(T_{next} < T_{max} \mid T_d) \geq P_{min} \end{cases}$$

where y is a value greater than 1, $P(T_{next}<T_{max}|T_d)$ is a probability that a data will be discarded before a time needed to make a next transmission, $T_{next}$, will be scheduled to occur later than a maximum retransmission, $T_{max}$, based on a current delay, $T_d$, and $P_{min}$ is a minimum loss rate defined by a Quality of Service Class Identifier.

10. The device of claim 1, the baseband modem further configured to obtain the static weight value for each of the plurality of signals from a predetermined data.

11. A method for a multi-subscriber identity module (SIM) device to provide access to a radio frequency (RF) unit of the device, comprising:
assigning a static weight value to each of a plurality of signals;
calculating a true weight value for each signal comprising modifying the static weight value with a dynamic value;
determining a signal with a highest true weight value from the plurality of signals; and
providing the signal with the highest true weight value access to the RF unit of the device.

12. The method of claim 11, wherein the dynamic value is based on at least one of a performance consideration value or a signal status value.

13. The method of claim 12, wherein the performance consideration value comprises a probability of reception or transmission of the signal.

14. The method of claim 12, wherein the signal status value of each signal is calculated based on a signal history of each signal.

15. The method of claim 11, further comprising obtaining the static weight value for each of the plurality of signals from a predetermined data.

16. The method of claim 11, wherein calculating the true weight value of each signal further comprises using a formula:

$$W_{true}(i) = W_{init} * \delta * \alpha$$

where $W_{true}$ is the true weight, $W_{init}$ is the static weight value assigned to each signal, δ is a probability of data reception or transmission, and α is a value calculated from a history of the previous transmissions of the signal.

* * * * *